US008763077B2

(12) United States Patent
Oberheide et al.

(10) Patent No.: US 8,763,077 B2
(45) Date of Patent: Jun. 24, 2014

(54) SYSTEM AND METHOD FOR ENFORCING A POLICY FOR AN AUTHENTICATOR DEVICE

(71) Applicant: Duo Security, Inc., Ann Arbor, MI (US)

(72) Inventors: Jon Oberheide, Ann Arbor, MI (US); Douglas Song, Ann Arbor, MI (US); Adam Goodman, Ann Arbor, MI (US)

(73) Assignee: Duo Security, Inc., Ann Arbor, MI (US)

( * ) Notice: Subject to any disclaimer, the term of this patent is extended or adjusted under 35 U.S.C. 154(b) by 0 days.

(21) Appl. No.: 13/647,166

(22) Filed: Oct. 8, 2012

(65) Prior Publication Data
US 2013/0091544 A1    Apr. 11, 2013

Related U.S. Application Data

(60) Provisional application No. 61/544,273, filed on Oct. 7, 2011.

(51) Int. Cl.
G06F 21/00    (2013.01)

(52) U.S. Cl.
USPC .......................................................... 726/1

(58) Field of Classification Search
USPC .......................................................... 726/1
See application file for complete search history.

(56) References Cited

U.S. PATENT DOCUMENTS

| 6,823,359 | B1 | 11/2004 | Heidingsfeld et al. |
| 6,934,858 | B2 | 8/2005 | Woodhill |
| 7,447,784 | B2 | 11/2008 | Eun |
| 7,574,733 | B2 | 8/2009 | Woodhill |
| 7,982,595 | B2 * | 7/2011 | Hanna et al. .................. 340/506 |
| 8,136,148 | B1 | 3/2012 | Chayanam et al. |
| 8,332,627 | B1 | 12/2012 | Matthews et al. |
| 2005/0268107 | A1 | 12/2005 | Harris et al. |
| 2006/0130139 | A1 * | 6/2006 | Sobel et al. ...................... 726/22 |
| 2009/0187986 | A1 | 7/2009 | Ozeki |
| 2010/0042954 | A1 | 2/2010 | Rosenblatt et al. |
| 2010/0114740 | A1 | 5/2010 | Dominguez et al. |
| 2010/0115578 | A1 * | 5/2010 | Nice et al. .......................... 726/1 |
| 2010/0121767 | A1 | 5/2010 | Coulter et al. |
| 2010/0216425 | A1 | 8/2010 | Smith |
| 2012/0090028 | A1 | 4/2012 | Lapsley et al. |
| 2012/0198050 | A1 * | 8/2012 | Maki et al. ..................... 709/224 |
| 2012/0216239 | A1 * | 8/2012 | Yadav et al. ....................... 726/1 |
| 2013/0042002 | A1 * | 2/2013 | Cheeniyil et al. ............. 709/225 |

* cited by examiner

Primary Examiner — Matthew Smithers
(74) Attorney, Agent, or Firm — Jeffrey Schox; Brian Van Osdol

(57) ABSTRACT

A system and method including defining at least one device authentication policy; at a policy engine, initializing authentication policy processing for an authenticator device; collecting device status assessment; evaluating policy compliance of the device status assessment to an associated defined device authentication policy; and enforcing use of the authenticator device according to the policy compliance.

18 Claims, 6 Drawing Sheets

SYSTEM AND METHOD FOR ENFORCING A POLICY FOR AN AUTHENTICATOR DEVICE

CROSS-REFERENCE TO RELATED APPLICATIONS

This application claims the benefit of U.S. Provisional Application No. 61/544,273, filed 7 Oct. 2011, which is incorporated in its entirety by this reference.

TECHNICAL FIELD

This invention relates generally to the authentication field, and more specifically to a new and useful system and method for enforcing a policy for an authenticator device in the authentication field.

BACKGROUND

Two-factor authentication is commonly used to increase the confidence in a user's identity and augment existing authentication factors such as passwords. While a password or other knowledge-based factor ("what you know") can be captured, phished, and replayed by a malicious party, an authentication factor that requires possession of a unique device ("what you have") can provide greater security. These "what you have" authentication factors commonly take the form of a hardware token (eg. RSA's infamous SecurID product line) that generates one-time passcodes. These one-time passcodes are commonly 6 digit numeric passcodes generated using an algorithm and a stored secret key. While these hardware devices offer a strong second factor of authentication when deployed alongside traditional knowledge-based passwords, the devices are expensive, difficult to manage, and painful for end users having to carry around an extra device at all times. As mobile devices become increasingly ubiquitous, powerful, and extensible to run third-party applications, they present an attractive replacement for hardware tokens. Instead of carrying around an expensive hardware token to generate one-time passwords, a user can simply use an application on their phone to generate the same one-time passwords. However, this increase in usability, convenience, and management comes at the cost of ensuring the integrity and security of the mobile application and mobile device software. While a dedicated hardware token can be tamper-resistant, have a small trusted computing base, and accept limited outside input, a mobile device is a rich software environment that often suffers vulnerabilities and other security weaknesses that plague any non-trivial software system. Therefore, if a mobile device is used in place of a hardware token for authentication, it is imperative that the device's storage, applications, and platform remain in a secure state and are not compromised by attackers or malicious applications that may reside on the same device. Unfortunately, such attacks against mobile devices do take place and the threat of mobile malware and other types of mobile attacks will only increase in the future as they evolve into more attractive targets to compromise. Therefore, organizations that wish to use mobile devices as an form of authentication (whether OTP-based or otherwise) have a difficult trade-off to evaluate between the increased security/isolation but decreased usability of a dedicated hardware device, and the increased usability but decreased security/isolation of a mobile device. Thus, there is a need in the authentication field to create a new and useful system and method enforcing a policy for an authenticator device. This invention provides such a new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

A system and method of preferred embodiments function to define, evaluate, and enforce a policy for the use of computing devices as authenticators. Modern two-factor authentication approaches often include the use of a mobile device as a secondary authenticator, but the system and method may alternatively be used with any suitable computing device used as an authenticator device. The system and method preferably alleviates at least some risk associated with the security threats, greater attack surface, and potential compromises of mobile device and its software. The system and method thus can function to potentially make a mobile device suitable for use as an authenticator. The system and method preferably allow an administrator to define and enforce policies to determine when a user is permitted or denied use of their mobile device as an authenticator by collecting and evaluating information about the software state of the mobile device and any perceived weaknesses or other attributes of the device, platform, or applications that may have a relevant impact on the security of the device or its authentication functionality. Such policies may be based on the software state of the mobile device and any perceived weaknesses or other information and attributes of the device, platform, or applications that may compromise its integrity as a strong authentication mechanism. For example, a user accessing their online bank account from their PC may provide a username and password to log in, and then be challenged to provide a one-time password generated by their mobile device as a secondary authentication factor. After completing primary authentication with the username and password, an authenticator application on the user's mobile device may collect information to provide to a policy engine of a authentication service (in this case, the online bank) to determine whether the mobile device is suitable and trusted for use as a secondary authentication factor. Based on the evaluation of policies acting upon the collected information, the authentication service would enforce whether or not the device is deemed appropriate for use as a trusted authenticator.

1. System for Enforcing a Policy for an Authenticator Device

Figure 1:
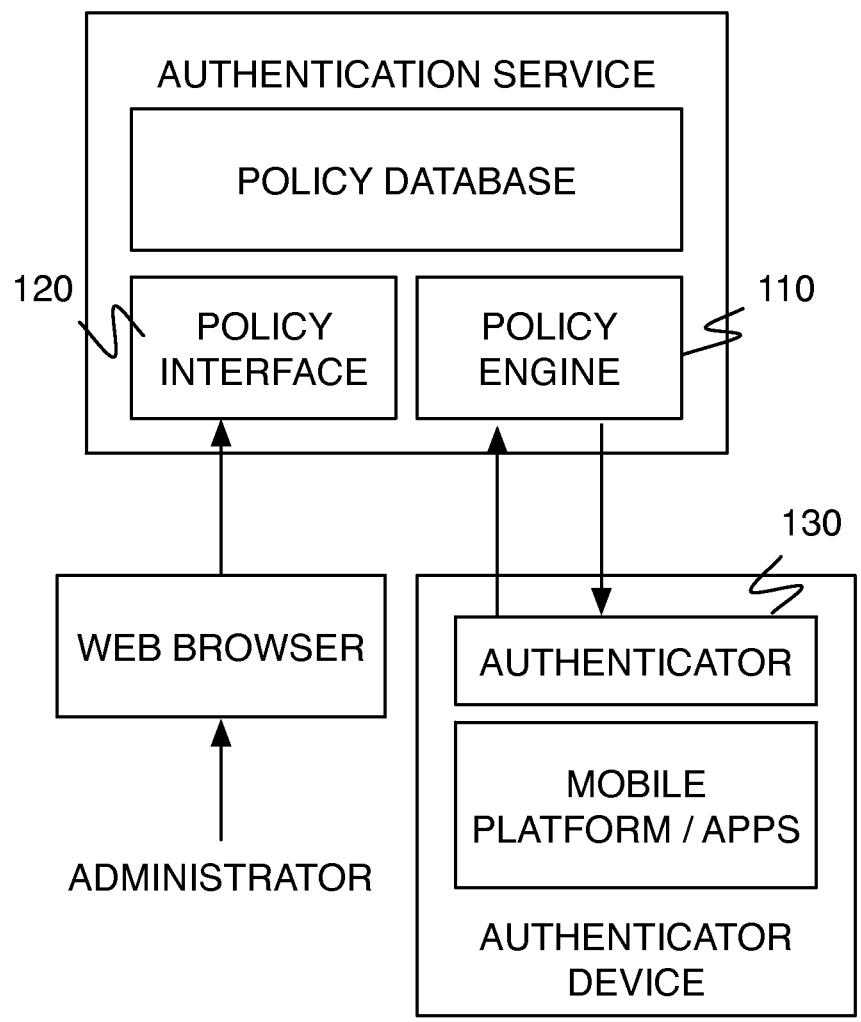
FIG. 1 is a schematic representation of a system of a preferred embodiment of the invention.

As shown in FIG. 1, a system enforcing a policy for an authenticator device of a preferred embodiment can include a policy engine 110, a policy interface 120, and an authenticator 130. The system functions to enable defined policies to regulate the use of a device as an authenticator. The policies preferably focus on the device status, and more preferably on the device vulnerability status. The system is preferably used and integrated with or alongside an authentication system that uses the access to a particular computing device as part of the authentication security. The authentication system may be any suitable authentication system such as a two factor authentication system, a device-based authentication system, or any suitable authentication system that at least in part depends on the use of a computing device of a user. The authentication system is preferably hosted in a network accessible cloud-based system or distributed computing infrastructure. The authentication system typically includes a plurality of accounts. Policies may be defined and enforced individually for each account or class of accounts.

A policy engine 110 of a preferred embodiment functions to regulate authentication attempts according to relevant policies. The policy engine 110 is tasked with evaluating an authentication request in the context of a defined policy and determining whether or not the computing device is suitable for use as an authenticator based on the result of that evaluation. The policy engine 110 preferably includes or has a communication channel to a policy database. The policy engine 110 additionally can include a communication interface through which authentication requests are received. The policy engine 110 can be a standalone service used in combination with an outside authentication system, but may alternatively be integrated in an authentication system. The policy engine may alternatively be integrated with the authenticator and be located on the computing device used as an authenticator device. Preferably, the policy engine 110 works in cooperation with a two-factor authentication system. The particular policy evaluation procedure may consist of traditional boolean logic expressions (eg. "IF platform_version<2.3.2 AND component_version<1.5"), standalone services with rich functionality (eg. analyze the applications installed on the device to determine whether they are malicious or not), and any other processes or heuristics that may be appropriate to evaluate whether a mobile device is suitable for use as an authenticator.

A policy interface 120 of a preferred embodiment functions to define policies. The policy interface is a software component designed to allow an administrator or other appropriately designated user to define policies around the use of a user's computing device as an authenticator. Typically, the policy interface would be a web application that an administrator would interact with using a web browser to create, read, update, or delete policies for the administrator's organization's users. The policy interface 120 may alternatively be an application programming interface (API) for programmatic setting of policies. Additionally the system may have policies preset or set in an alternative way and may not include a policy interface 120. Any suitable rules or restrictions may be set for allowed use of an authenticator device. For example, an administrator may define a policy that disallows the use of SMS-delivered passcodes if a user's mobile device is running suspicious applications that may have access to their SMS inbox. By defining such a policy, an administrator may reduce the risk of the passcodes being stolen by a malicious application on the user's mobile device, thereby allowing an attacker to impersonate the user by using the stolen passcodes. As another example, the administrator may define a policy that requires the user's device to undergo a "health check" where it may be scanned for malicious applications or analyzed for weaknesses that may compromise its integrity or security. If the health check (i.e., vulnerability assessment) fails, the user may be disallowed to use that mobile device as an authenticator as it has been deemed too risky by the administrator's policy. The resulting policies defined by the administrator are stored in the policy database.

The authenticator 130 of a preferred embodiment functions to enforce the results of the policy engine 110. The authenticator is preferably a software component that is present on the computing device of a user that typically provides some strong authentication functionality. The authenticator 130 preferably facilitates the authentication process. For example, basic HMAC-based One time Password (HOTP), Time-based One-time Password (TOTP), or any suitable One-time Password (OTP) generation can be employed for mobile app-based authenticators to provide strong authentication. When the authenticator is invoked, either by the user or by the authentication service, the authenticator 130 may enforce whether or not the device is permitted for use as an authenticator device based on the results of the policy engine's output. The authenticator 130 can also collect and transmit information from the mobile device to an authentication service that may be relevant to the evaluation of the defined policies. The authenticator 130 may be built into the mobile software platform itself, installed as a third-party app by the user of the mobile device, or delivered via any other mechanism available to execute software on the mobile device. The authenticator 130 preferably includes communication channels to at least the authentication system and/or policy engine.

2. Method for Enforcing a Policy for an Authenticator Device

Figure 2:
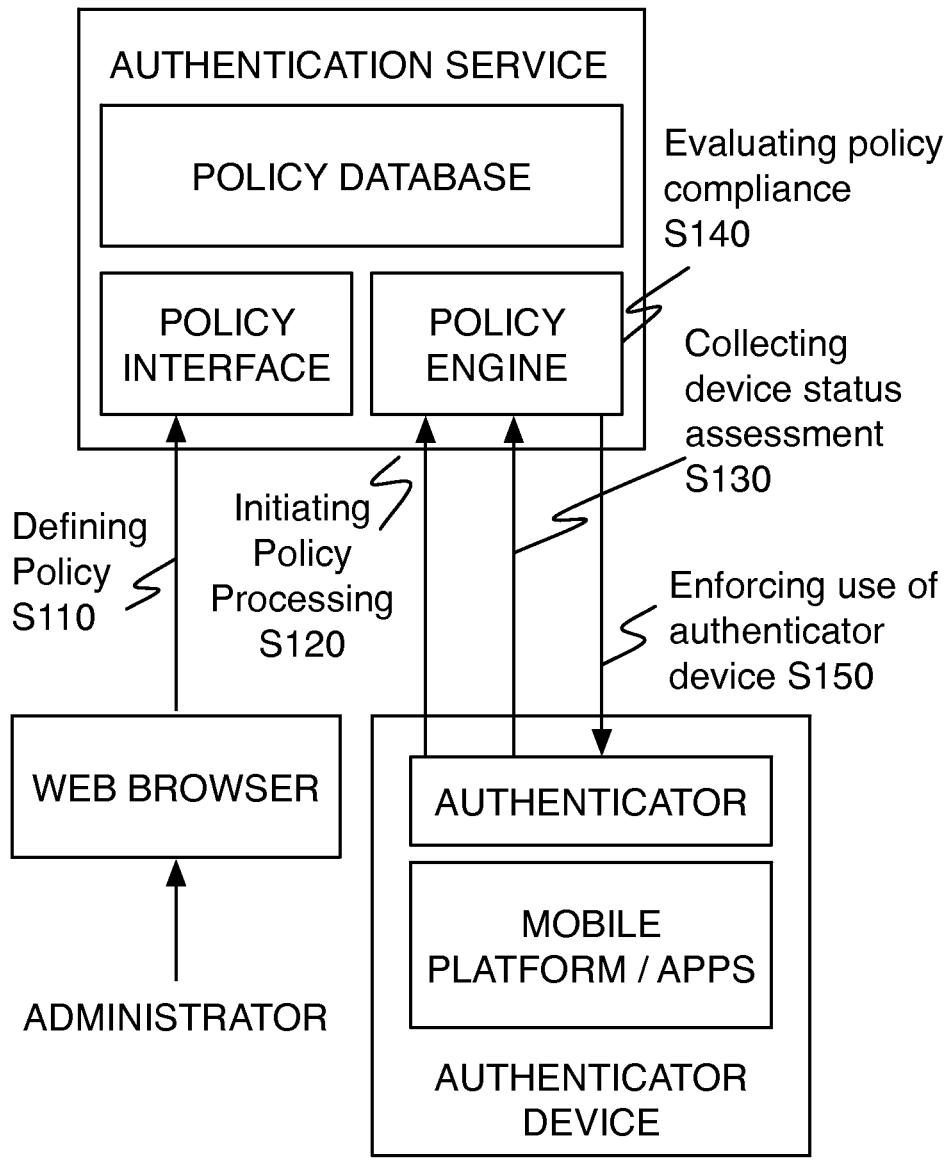
FIG. 2 is a schematic representation of a method of a preferred embodiment of the invention.

As shown in FIG. 2, a method for enforcing a policy for an authenticator device of a preferred embodiment can include defining at least one device authentication policy at a policy engine S110, at a policy engine initializing authentication policy processing for an authenticator device S120, collecting a device status assessment S130, evaluating policy compliance of the device status assessment to an associated device authentication policy S140, and enforcing use of the authenticator device according to the policy compliance S150. The method functions to use definable policies and device specific information to determine if a device may be used for authentication. The device is preferably used in authentication by proving that the user has possession of a device associated with an account. The method is preferably employed along with a two-factor authentication process, where an authenticator device (e.g., a mobile device) is used as a secondary factor in authenticating a user. The method may alternatively be used in any suitable authentication process typically one where device possession is incorporated into the authentication process. The method can preferably facilitate checking if the device has been compromised in a way that would jeopardize the authentication process or system and appropriately allowing or preventing authentication with the device.

Step S110, which includes defining at least one device authentication policy at a policy engine, functions to determine at least one policy for evaluating the security of an authenticator device. The device authentication policy is preferably created through a user interface. An administrator or other authorized user interacting with a policy user interface can preferably create, read, update, or delete policies governing the conditions when a mobile device is deemed suitable to be used as an authenticator (most commonly using a mobile phone as a "what you have" second factor of authentication via OTPs, phone callback, SMS authentication, smartphone push authentication, etc). A device authentication policy may alternatively be defined through an application programming interface (API). As another alternative, the policy may be permanently set for the authentication through a settings file or in any suitable manner. A policy may alternatively be predefined by a third-party or automatically defined by any suitable algorithm or process. Additional policies may augment existing administrator-defined policies or eliminate the need for administrator-defined policies.

The device authentication policy can preferably be set for any suitable categorization of authentication requests. The device authentication policy is preferably for a particular account on an authentication system. Each account of an authentication system may have a policy set. A default policy may be used if no policy for a particular account is defined. The device authentication policy may alternatively be associated with a whole authentication system, a user-account type/label, a time of day, device type, or be associated with any suitable property of an account, authentication request, and/or authentication system. The device authentication policy preferably defines device parameters that an authenticator device must satisfy. The device parameters preferably include at least one parameter for the device status assessment that may define suitable application version numbers and allowed device health status. The device authentication policy is preferably stored in a policy database at the policy engine. This is preferably a resource existing in a networked computing system, but may alternatively policies may be stored locally on associated authenticator devices or in any suitable location.

Step S120, which includes at a policy engine initializing an authentication policy processing for an authenticator device, functions to trigger the policy engine to check if the authenticator device complies with the policy. Initializing an authentication policy process preferably occurs as a result of a user attempting to perform a step of an authentication process using the authenticator device. An authenticator on the device will preferably trigger an evaluation of the administrator-defined policies in order to determine whether the user should be able to use their mobile device as an authenticator. As a result, the policy engine preferably receives an authentication policy request. The authentication policy request may be transmitted by the authenticator on the device or may alternatively be transmitted by an authentication system. If the policy engine requires additional information about the mobile device in order to evaluate the administrator-defined policies, it can query the authenticator on the device to provide a device status assessment. Alternatively, the authentication policy request may include the device status assessment.

Step S130, which includes collecting a device status assessment, functions to retrieve parameters that indicate the status of the authenticator device. An authenticator on the device preferably collects information from the device. For example, the policy engine may request that the authenticator collect a list of all the installed applications on the mobile device and return them to the policy engine so that the policy engine can process the list to see if any potentially risky or malicious applications are installed on the mobile device that would compromise the integrity of the authenticator device as a strong authenticator. The authenticator preferably transmits the device status assessment along with any additional relevant information from the device to the policy engine to assist in the evaluation of the administrator-defined device authentication policies. This transmission can occur over traditional wide-area network communications mechanisms available on the mobile device such as WiFi, cellular data service (eg. EDGE, GSM, HSDPA, LTE, etc), even local radio communications such as BlueTooth, or any suitable networking protocol. Alternatively, the device status assessment may be transmitted to a policy engine operating locally on the device. Additionally, the method may include calculating a vulnerability assessment. The vulnerability assessment may be calculated in any suitable manner. In one variation, the vulnerability assessment may be calculated by the system and/or method described in U.S. patent application Ser. No. 13/601,409, titled "SYSTEM AND METHOD FOR ASSESSING VULNERABILITY OF A MOBILE DEVICE", filed 31 Aug. 2012 by the assignee of the present invention, which is hereby incorporated in its entirety by this reference. The results of the vulnerability assessment may be transmitted to the policy engine. Alternatively, the policy engine may facilitate the calculation of the vulnerability assessment. In calculating the vulnerability assessment, the policy engine and/or authentication system may receive at least one vulnerability assessment request that includes an object identifier for an operative object of a mobile computing device, wherein the vulnerability assessment request originates from the authenticator device; and a module to identify a vulnerability assessment associated with the identifier of the operative object.

In one variation, device status assessments from the computing device may be delivered to the policy engine and/or authentication service periodically or lazily (instead of on-demand at the time of authentication) and stored in the policy database to develop an extended historical view of the device's perceived health. The historical status assessment may be used in evaluating policy compliance. When evaluating the policy compliance, the use of the most recent device status assessment may be used. For example, device status assessments may be collected every hour. When evaluating policy compliance the device status assessment from the last hour can be used such that the device status assessment is typically no older than an hour. This technique may be useful when the device status assessment requires time-consuming processing.

Step S140, which includes evaluating policy compliance of the device status assessment to an associated device authentication policy, functions to determine whether the computing device is suitable for use as an authenticator device. The policy engine preferably retrieves the necessary defined device authentication policies from the policy database/storage. A single policy preferably governs the policy compliance, but a plurality of policies may alternatively be used to cooperatively define a policy for an authenticator device. The particular policy evaluation procedure may consist of traditional boolean logic expressions (eg. "IF platform_version<2.3.2 AND component_version<1.5"), standalone services with rich functionality (eg. analyze the applications installed on the device to determine whether they are malicious or not), and any other processes or heuristics that may be appropriate to evaluate whether a mobile device is suitable for use as an authenticator. In one variation, a vulnerability assessment is calculated or received, and the vulnerability assessment is used in logic to determine policy compliance. For example, a vulnerability assessment may indicate a number of vulnerabilities on the device. The associated policy may only specify a particular vulnerability that should be used to selectively give or deny authentication. If the vulnerabilities on the device do not include the policy specified vulnerabilities, the policy compliance is positive and authentication may be allowed. If at least one vulnerability of the device coincides with a policy specified vulnerability, then policy compliance is negative and authentication is denied.

Figure 3:
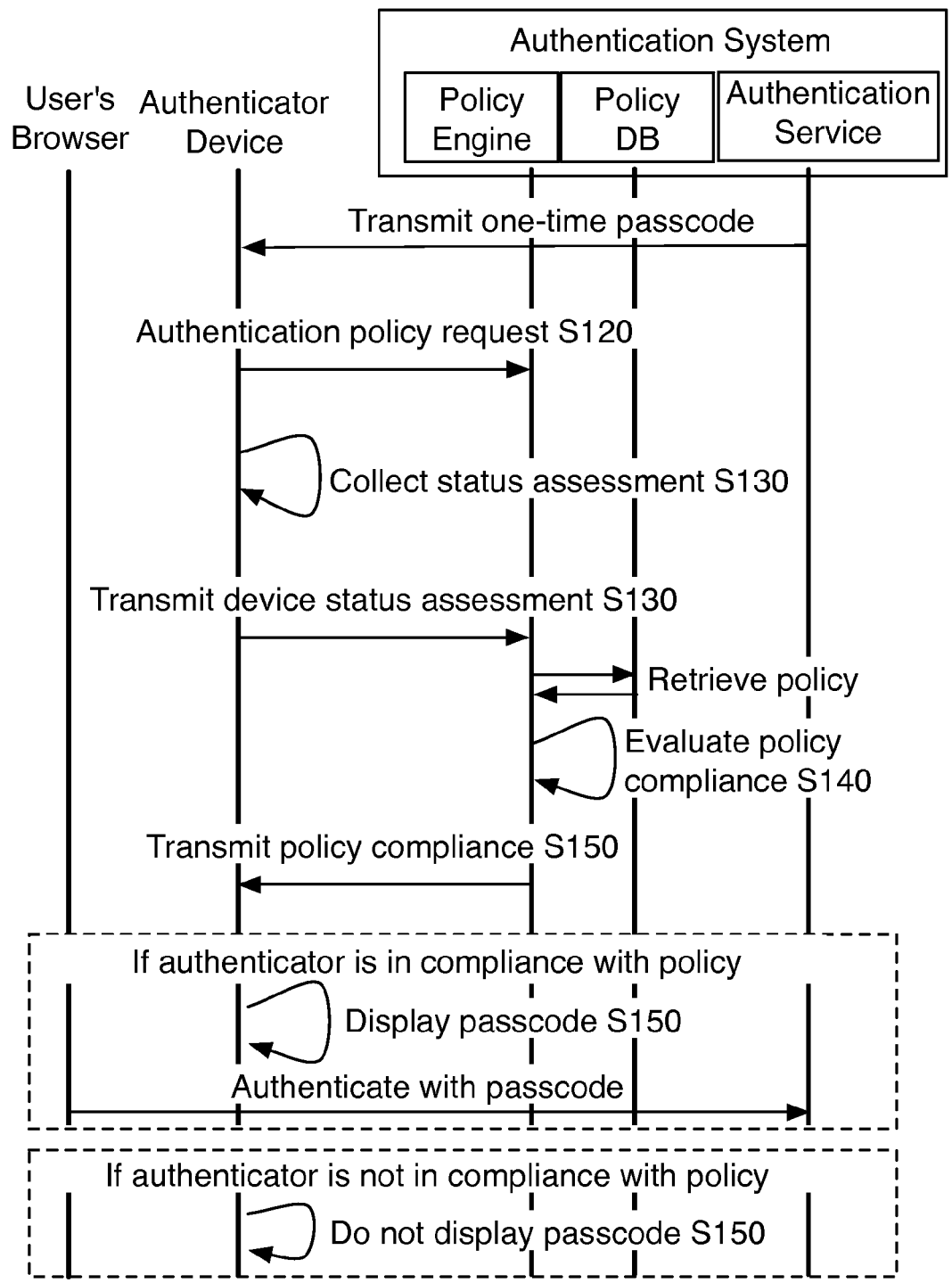
FIGS. 3-6 are schematic diagrams of variations of a method of a preferred embodiment of the invention.
Figure 4:
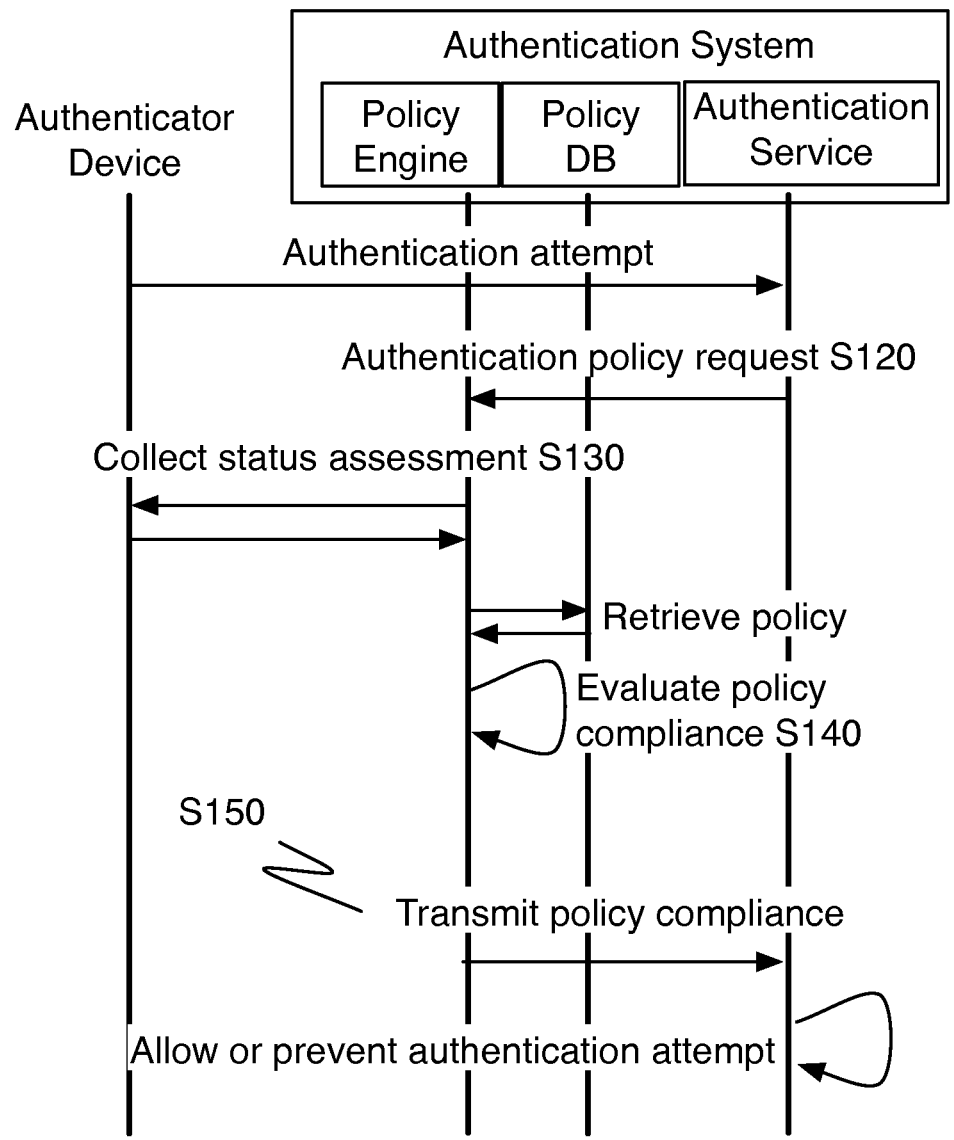

Step S150, which includes enforcing use of the authenticator device according to the policy compliance, functions to appropriately allow, disallow, or otherwise respond to an attempt to authenticate with the authenticator device. Enforcing may include the policy engine transmitting the policy compliance evaluation to the computing device as shown in FIG. 3. The authenticator on the computing device can then allow or disallow use of the device as an authenticator device. For example, if the evaluation indicates the status of the device is not compliant with the policy, then the OTP or other authentication process that involves the computing device is prevented from being completed. In one variation, the OTP is not displayed and/or generated if the device is not compliant. In another variation, the authenticator prevents communication of authentication information to the authentication system. Similarly, the authenticator can transmit a message that indicates that the authentication system should not accept authentication using the device. The enforcement of the result of the policy evaluation can not only be enforced on the mobile device itself (eg. disallowing the user to use or interact with the authenticator application to generate one-time passcodes), but also, enforced by the authentication service to deny any attempts by the user to authenticate using that device if it has been deemed unsuitable for use as an authenticator as shown in FIG. 4. For example, the user may be denied access to the authenticator functionality on the mobile device but also additionally be denied by the service if they attempt authentication anyway. The policy engine preferably will transmit a message to the authentication system to indicate that the device is not allowed to be used as an authenticator device. Additionally, enforcing use of the authenticator device may include facilitating an update to the authenticator device. Facilitating may involve communicating the issues that need to be fixed, actions that can be taken to resolve the issues, the code or update code to resolve the issues, instructions to initialize an automatic device update, and/or any suitable response to aid in bringing the device into compliance with the associated policy. When the device is updated, the method may repeat any of the above steps to check if the device complies with the policy and can be used as an authenticator device of an authentication system.

Figure 5:
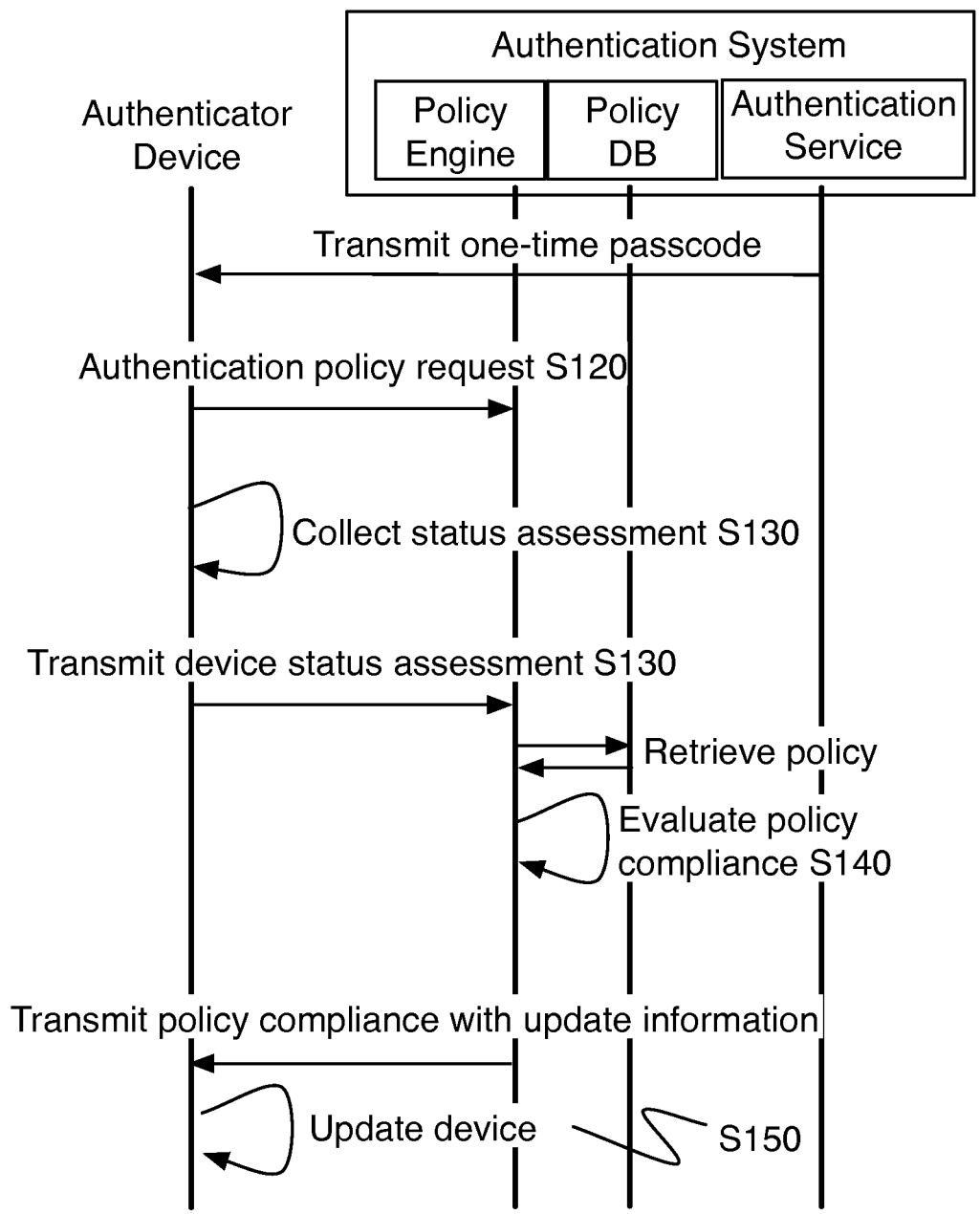

In exemplary implementation of a preferred embodiment of the method, the method is used with a two-factor authentication system as shown in FIG. 3. The authentication system will send a secondary-authentication passcode to a device. An authenticator will preferably facilitate transferring the passcode back to the authentication system. This is preferably facilitated by displaying the passcode in an SMS app, a push notification, an application message. A user will preferably be prompted to confirm, repeat, or otherwise correctly acknowledge the passcode prior to the authenticator transferring the passcode to the authentication system. A policy engine of the authentication system will preferably evaluate a policy. The policy can be associated with the user account and/or device in process of authentication, but may alternatively be associated with any suitable aspect or be a default policy. Depending on the associated policy, the policy engine may request a device status assessment. The authenticator will preferably compile and generate a device status assessment. The authenticator preferably transmits the device status assessment and it is received at the policy engine. The policy engine preferably processes the policy and the device status assessment to determine if the device should be allowed to be used as an authenticator device or not. As an additional variation, the policy engine may initiate a device update to remedy issues with the current device status assessment as shown in FIG. 5. Upon completing the update, the device can preferably be used as an authenticator device. When the device is determined to be an allowed authenticator device, the passcode may be processed and used in completing authentication.

Figure 6:
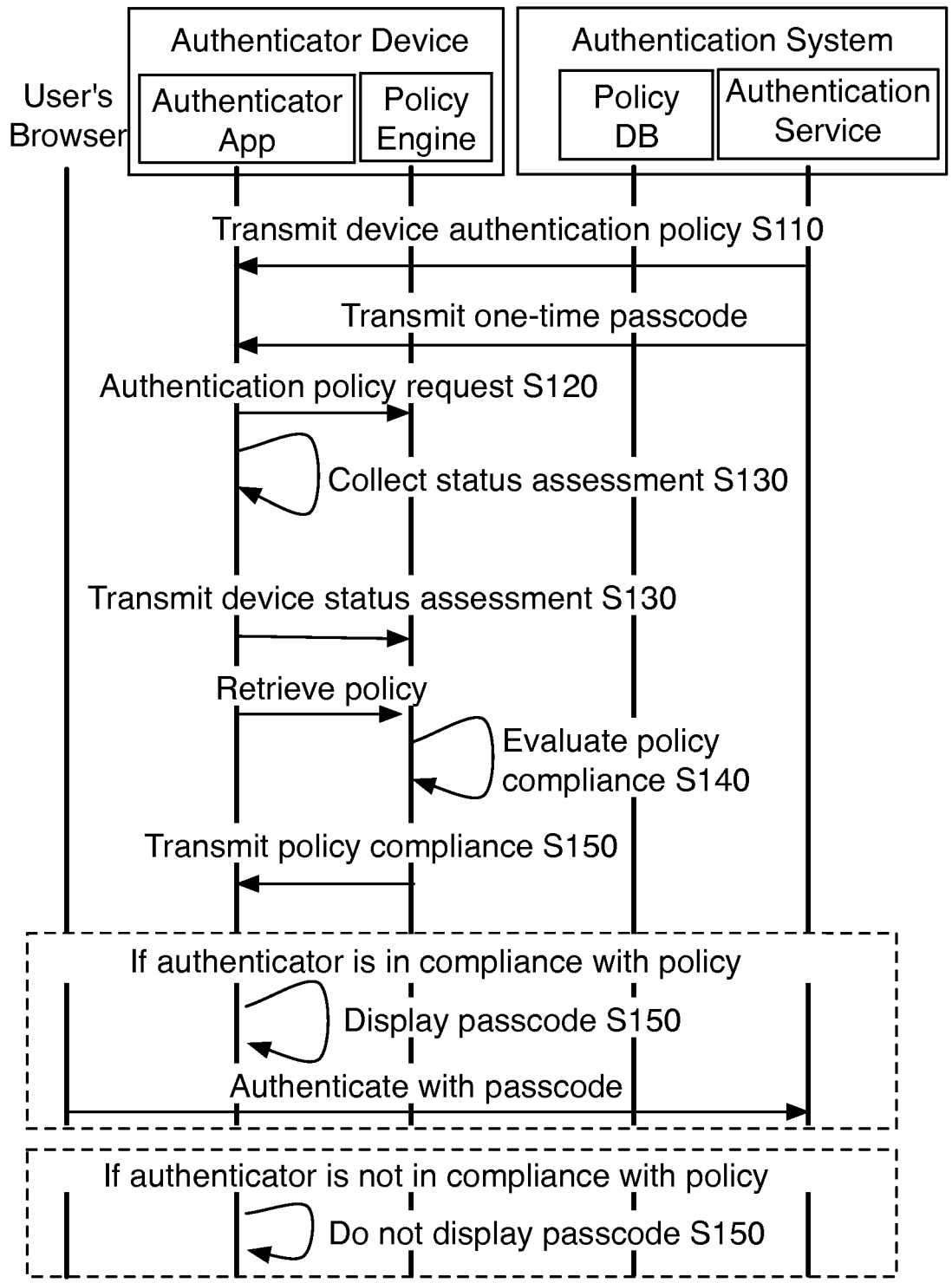

In another exemplary implementation of a preferred embodiment of the method, the method is used for locally policing the use of a computing device for authentication as shown in FIG. 6. The authenticator application or service on the phone preferably includes the policy engine. At least one device authentication policy is received and stored locally on the device. The policy may alternatively be retrieved from a remote database or storage and temporarily stored on the device. When a user is attempting to use the device to authenticate (whether that be during a two-factor authentication process or other suitable authentication process), the policy engine will preferably be initiated and will evaluate policy compliance of the device. Typically, the evaluation will occur prior to enabling user authentication with the device. For example, if a passcode is sent to the device, the passcode may be readable through an application on the device. The user can be notified about the received passcode by a push notification, but then upon opening the application, the passcode will only be revealed if the device is in compliance with the policy. The policy engine preferably uses device status assessment and more preferably a vulnerability assessment in combination with the policy to determine the device compliance results. As discussed above, enforcing the compliance results preferably includes selectively enabling one of several responses. As one response, if the device is in compliance with the device authentication policy, then authentication using the device is allowed. In the current example, this could include displaying the passcode, such that the user may enter the passcode on another device or complete an authentication action. As another response, if the device is not in compliance with the device authentication policy, then authentication using the device may be prevented. In the current example, this could include displaying an error message and not showing the passcode or disabling completion of the authentication process. Additionally or alternatively, the response may prompt updating the device. The update would preferably resolve issues preventing device compliance such as updating an application to a more secure version, deleting or fixing malicious components, or any suitable device update. Upon updating the device, the policy engine can preferably re-evaluate the policy compliance.

An alternative embodiment preferably implements the above methods in a computer-readable medium storing computer-readable instructions. The instructions are preferably executed by computer-executable components preferably integrated with a policy engine used in cooperation with an authentication system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

We claim:

1. A method comprising:
defining at least one authenticator device authentication policy through an administration interface;
at a policy engine, initializing authentication policy processing for an authenticator device;
collecting an authenticator device status assessment;
evaluating policy compliance of the authenticator device status assessment to an associated defined device authentication policy; and
enforcing use of the authenticator device according to the policy compliance comprising:
  if the policy compliance indicates the authenticator device status assessment is in compliance with the authenticator device authentication policy, allowing the authenticator device to be used in authenticating a primary client device, wherein the primary client device is distinct from the authenticator device; and
  if the policy compliance indicates the authenticator device status assessment is not in compliance with the authenticator device authentication policy, preventing the authenticator device to be used in authenticating the primary client device.

2. The method of claim 1, wherein upon receiving an authentication policy request at the policy engine, initializing authentication policy processing.

3. The method of claim 1, wherein collecting authenticator device status assessment includes collecting at least one application version number of an application on the authenticator device.

4. The method of claim 3, wherein collecting authenticator device status assessment is performed at an authenticator on the authenticator device, and further comprises, the authenticator communicating the device status assessment to the policy engine.

5. The method of claim 1, wherein collecting authenticator device status assessment includes collecting a vulnerability assessment.

6. The method of claim 5, wherein collecting a vulnerability assessment includes identifying a vulnerability assessment from an object identifier for an operative object of the authenticator device.

7. The method of claim 5, further comprising periodically collecting a vulnerability assessment and generating a historical view of the device status as part of the authenticator device status assessment used in evaluating policy compliance.

8. The method of claim 1, wherein the at least one authenticator device authentication policy is defined through an administrator user interface.

9. The method of claim 8, wherein a plurality of different authenticator device authentication policies are defined for a plurality of different accounts of an authentication system; and the policy engine selects the authenticator device authentication policy for evaluation according to a mapping between the authenticator device and an account.

10. The method of claim 1, wherein the policy engine is integrated with an authentication system in a cloud computing environment.

11. The method of claim 1, wherein allowing the authenticator device to be used in authenticating a primary client device comprises allowing the authenticator device to facilitate transferring a passcode in authenticating the primary client device; and preventing the authenticator device to be used in authenticating the primary client device comprises preventing the authenticator device from facilitating transfer of the passcode in authenticating the primary client device.

12. The method of claim 11, wherein enforcing use of the authenticator device further includes facilitating an authenticator device update to comply with the associated authenticator device authentication policy.

13. The method of claim 12, further comprising upon completing the authenticator device update, evaluating policy compliance and enforcing use of the authenticator device for at least a second time.

14. The method of claim 11, wherein allowing the authenticator device to be used in authenticating a primary client device and preventing the authenticator device from authenticating the primary client device are executed on the authenticator device.

15. The method of claim 11, wherein allowing the authenticator device to be used in authenticating a primary client device and preventing the authenticator device from authenticating the primary client device are executed in an authentication system.

16. The method of claim 11, wherein allowing the authenticator device to be used in authenticating a primary client device and preventing the authenticator device from authenticating the primary client device are executed on the authenticator device and in an authentication cloud system.

17. The method of claim 11, further comprising at an authenticator of the authenticator device, receiving the passcode; wherein allowing the authenticator device to be used in authenticating a user includes displaying the passcode; and wherein preventing the authenticator device from authenticating a user includes not displaying the passcode.

18. The method of claim 11, further comprising at an authenticator of the authenticator device receiving the passcode; and wherein preventing the authenticator device from authenticating a user includes invalidating the passcode for authentication.

* * * * *